Jan. 1, 1963 R. H. DE WITT 3,071,026
SAW CHAIN GRINDER
Filed May 21, 1959 3 Sheets-Sheet 2
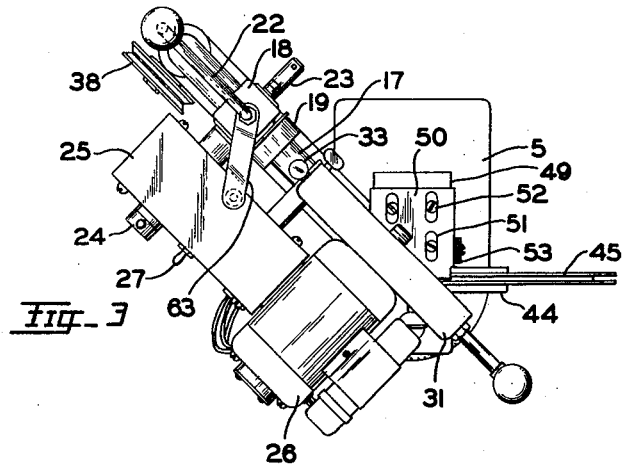
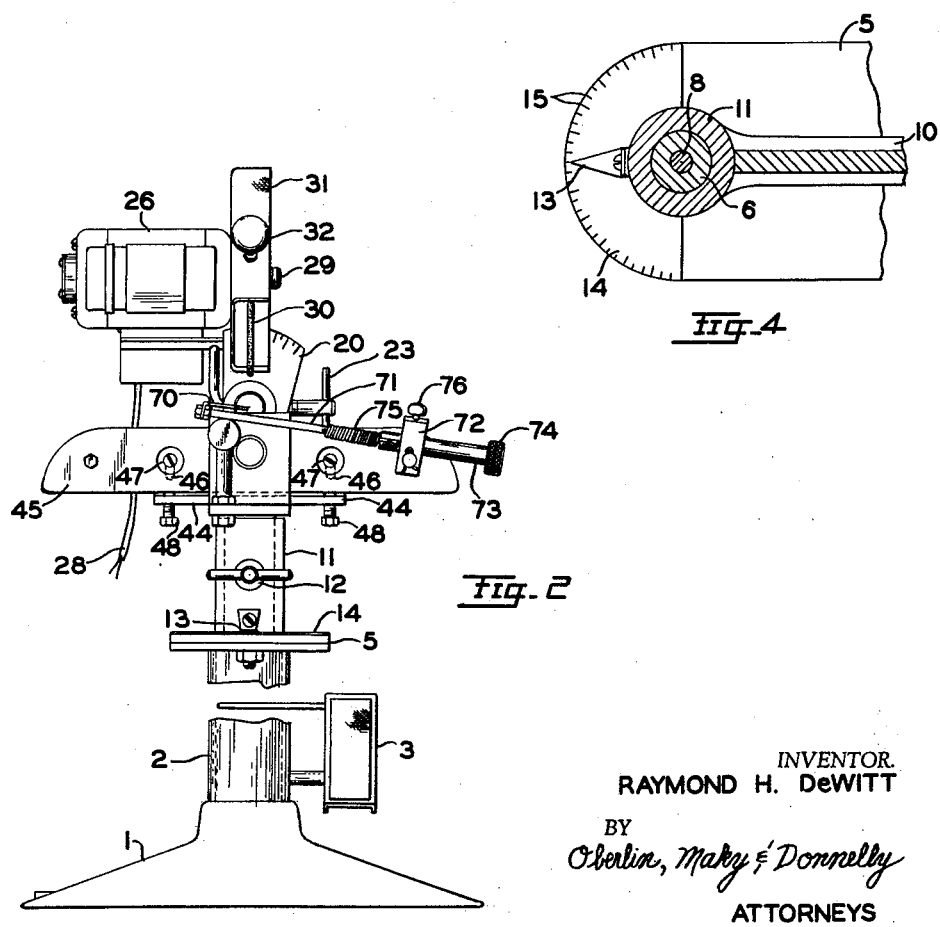
INVENTOR.
RAYMOND H. DeWITT
BY
Oberlin, Maky & Donnelly
ATTORNEYS

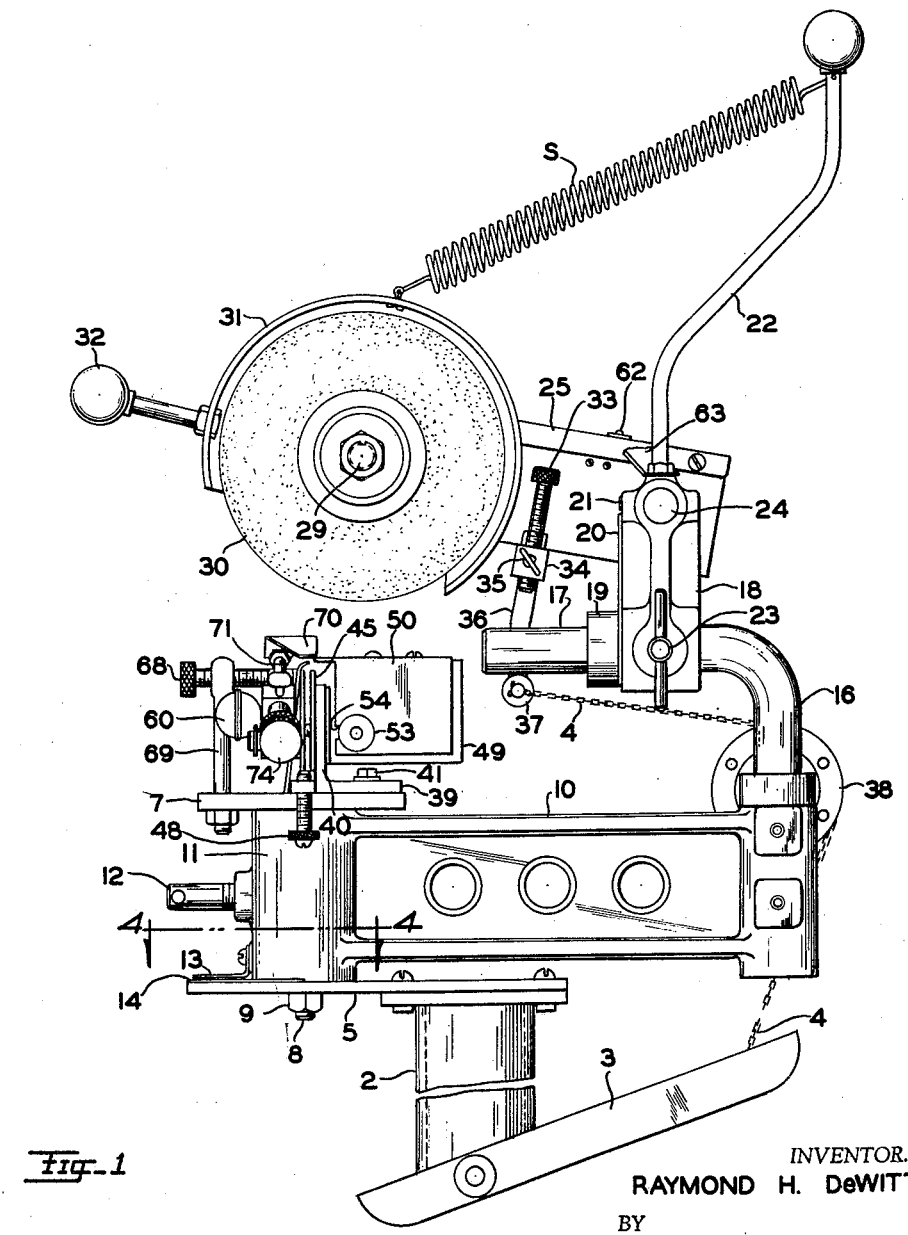

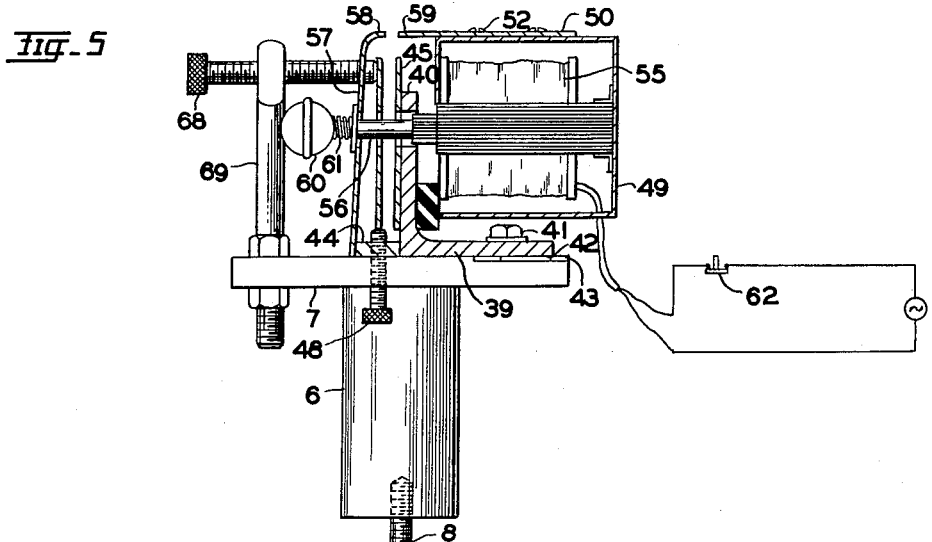

United States Patent Office 3,071,026
Patented Jan. 1, 1963

3,071,026
SAW CHAIN GRINDER
Raymond H. De Witt, Plymouth, Ohio, assignor to The Fate-Root-Heath Company, Plymouth, Ohio, a corporation of Delaware
Filed May 21, 1959, Ser. No. 814,862
19 Claims. (Cl. 76—40)

This invention relates to a novel grinding machine designed particularly, as indicated, for saw chain sharpening and maintenance.

It is a primary object of my invention to provide a saw grinder which can quickly be set and adjusted to produce the particular machining operation desired at very high speed, for example, the sharpening of saw chain cutters. As compared to other machines on the same order which are now available, the ease of set-up and the grinding rate in my new machine are so enhanced that a very substantial reduction in the over-all time required for the complete re-machining of a saw chain results, as is evidenced, for example, by the fact than an average thirty inch saw chain can thus be re-machined in from three to five minutes.

The extremely fast machine time in use of the new grinder derives principally from the provision of certain automatic features serving to reduce the hand operations required to a practical minimum and thereby making the grinder semi-automatic. Such grinder basically comprises means for positioning and holding the saw and a grinding head movable with respect thereto, and the semi-automatic operation of the same involves providing foot-operated control of the movement of the grinding head and, whether the head be moved by hand or such foot control, the use of a novel vise operative automatically to clamp the saw section to be ground in response to the advance of the grinding head on the same. In the illustrative embodiment of the invention to be described in detail hereinafter, with the noted foot control, the only operation which the operator is required to perform by hand is the advance of the saw chain to index the teeth or cutters thereof to be successively brought to the position for grinding. All such elements of the same hand are ground in succession and then a simple re-adjustment of the head by the operator is made to grind all the teeth of the other hand, with the direction of relative advance of the saw being the same.

It is also a primary object of my invention to provide a saw grinder capable of grinding exactly the same bevel, degree of angle, height, length, and depth on every cutter or element of the saw or, in other words, to provide a machine which is truly accurate and re-machines each element exactly alike.

The adjustments of the new grinder and the clamping of the saw as already mentioned are obviously also important in respect of the further objective of improved accuracy, with the adjustments of such kind and number as to provide and ensure the true centerline grinding essential to grind both right and left hand saw elements precisely alike without readjustments upon such change-over. To this end, my invention provides such a grinder having a reference axis about which the support for the grinding head is rotatively adjustable, and the head is adjustable both along the radius with respect to such reference axis and pivotally perpendicular to such radius; a guide for the saw is provided and this is adjustable so that the center of the guide coincides with such reference axis. The grinding wheel therefore pivots on the centerline of the properly positioned saw and by swinging the support for the same from a set angular displacement to one side of a zero or reference radius to an equal angular displacement to the other side in the same plane, the wheel is shifted from its position for grinding the teeth of one hand to its position for grinding the teeth of the other hand in like manner.

A further related object is to provide such grinder with improved stop means adjustable to control the depth of the cut, such stop means furthermore providing the same depth adjustment, if desired, even though the wheel may be pivoted to produce a different degree of bevel.

It is also an important object of the invention to provide a grinding machine having a saw guide and a grinding wheel mounted for such arcuate movement that the centerline of the guide is a small chord of the arc along which the wheel center moves, with the design, however, holding the deviation of such arc from the centerline to a tolerable small degree over a significant extent of the latter. In other words, the arc of the wheel center in this grinder is substantially coincident with the guide centerline over an appreciable distance and this distance reflects permissible wear of the wheel. To illustrate the importance of such characteristic, a grinder constructed in accordance with the detailed description to follow and employing a wheel having an initial diameter of six inches permits the wheel to be worn down to a four inch diameter before replacement is necessary; such performance is, and has been recognized by workers in the art as, decidedly superior to prior available machines on the same order.

The maintenance of saw chains may also involve machining of the rakers or depth control guides of the same, to make sure that each cutter takes an equal bite of the wood to be cut for uniform and smooth cutting. This type of operation usually calls for the rakers to be lowered, and it is also an object of my invention to provide a grinder as aforesaid capable of machining saw chain rakers in fast and accurate manner. A related object is to provide quick and precise setting of the grinding wheel to machine the rakers in predetermined, gauged relation to the cutters of the chain, and a further object is to actuate the grinding head in such manner as to ensure that each raker is accurately ground to the same degree determined by the setting, this last characteristic involving a particular means of actuating the grinding head to eliminate any play or variation in the engagement of the wheel with the several rakers of the chain.

It is also a major object of my invention to provide new and improved means for clamping a saw chain for grinding or other operations to be performed thereon.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a side elevation of a saw chain grinder in accordance with the present invention, the pedestal or floor support for this unit being broken for convenience;

FIG. 2 is a front elevation of such grinder;

FIG. 3 is a top plan view in which the grinding head has been moved to a different position of adjustment;

FIG. 4 is a sectional view taken approximately on the plane of the line 4—4 in FIG. 1;

FIG. 5 is a vertical sectional view of the saw chain guiding and clamping assembly of the grinder;

FIG. 6 is a fragmentary view of a section of saw chain as positioned in the grinder;

FIG. 7 is a cross-section taken on the plane of the line 7—7 in FIG. 6; and

FIG. 8 is a diagram serving to illustrate certain operating characteristics of the grinder.

With more particular reference to the drawings, the illustrated embodiment of the invention is a semi-automatic saw chain grinder which can either be mounted on a bench or supported by a pedestal, with the latter here shown and comprising a base 1 and a vertical column 2. The proportionate height of the column does not appear, since this would unnecessarily encumber the drawings, but it will be obvious that the pedestal will support the upper, working assembly at an elevation convenient for an operator. For a purpose to be described, a foot treadle 3 is pivoted to the column, at a lower side portion of the same, and a chain 4 is connected to the rear end of the treadle for actuation by the latter.

A horizontal table 5 is securely fastened to the top of the column 2 and projects forwardly, such table having a substantially semi-circular forward end and otherwise being generally rectangular, as shown in FIGS. 3 and 4. A sub-assembly, shown separated in FIG. 5, comprising a solid cylindrical piece 6 and a rectangular support plate 7 secured to the upper end of the same is rigidly mounted on the table 5 with the piece 6 having its lower end against the top surface of the table and its axis vertical and passing through the center of the semi-circular forward end of the table. The support plate 7, thus elevated above the table, is oriented so that its longer dimension extends fore and aft, and such sub-assembly is rigidly attached to the table by means of a threaded stud 8 projecting axially from the lower end of the cylindrical piece 6, through the table, and a nut 9 engaged thereon beneath the latter.

The cylindrical piece 6 serves as a bearing for a main arm 10 having a sleeve end 11 which is slipped on such piece before the latter is fastened to the table 5. The height of the sleeve end 11 is slightly less than that of the cylindrical piece, so that the arm 10, extending to the rear as shown, is free to swing in a horizontal plane about the vertical axis of the piece 6. A set screw 12 is threaded into the sleeve end 11, at the front, to engage the cylindrical piece therewithin and hold the main arm releasably in various positions of angular adjustment. A horizontal pointer 13 is attached at the front end of such arm, while a semi-circular scale 14 is secured to the top of the table about its curved front end. Such scale carries marking lines 15 on radii from the vertical axis of the front bearing or, in other words, from the pivot axis of the main arm 10, with the front center being marked zero and the lines to either side each indicating degrees of angular displacement, preferably up to ninety degrees, from the zero setting.

A knuckle 16 of general L-shape is attached at the rear end of the main arm in the same plane, such knuckle being of circular cross-section and having an upper, forwardly projecting portion 17 horizontal or parallel to the main arm. The axis of the knuckle portion 17 thus intersects the vertical pivot axis of the main arm, and a bracket 18 is pivoted on such knuckle portion perpendicular to the axis thereof. A collar 19 adjustable on the knuckle in front of the bracket supports a vertical scale 20 having radial lines at its upper edge, as shown in FIG. 2, which indicate degrees of angular displacement from the vertical to the right, as viewed from the front, preferably up to at least 45°. An indexing mark 21 is provided at the top center of the bracket, to cooperate with the scale 20, with a positioning arm 22 extending well upwardly from the bracket and a set screw 23 threaded through the latter for holding engagement with the knuckle.

The upper end portion of the bracket 18 supports a transverse shaft 24 and a grinding arm 25 is rotatably mounted on such shaft, at the left side of the bracket and projecting forwardly. This grinding arm is in fact a rectangular box, and a reversible electric motor 26 is secured transversely to the front end of the same. A conventional three-position throw switch 27 is mounted at the outer side of the grinding arm and is connected between the motor and the power supply cord 28 to control the former; throwing this switch to one side causes the motor to rotate in one direction while moving the switch to the other side energizes the motor to turn in the opposite direction.

The drive shaft 29 of the motor extends to the right, again as viewed from the front, and a grinding wheel 30 is removably fastened on the shaft, with the wheel being in the plane of the horizontal axes of the main arm and knuckle in FIG. 2. A partial shield 31 is secured to the face of the motor and has a flange which surrounds approximately two-thirds of the periphery of the wheel.

There is a forwardly projecting handle 32 fixed to the shield 31 and a spring S extending from the latter to the upper end portion of the rear adjusting arm 22, and it will be clear that this spring tends to lift the grinding head, while the front handle can be actuated to depress the same. When lowered in vertical condition, the center of the wheel will be on the vertical pivot axis of the main arm, with the lowermost position of the wheel determined by a thumb screw 33 threaded through a bar 34 attached to the underside of the grinding arm 25 and positioned so that the screw end will abut the front end portion of the knuckle; a set screw 35 is provided to engage the adjusting screw 33 and firmly hold the same in its various adjusted positions. The upward swing of the grinding arm 25 by the spring S is also adjustably determined, with an arm 36 also threadably engaged with the bar 34 serving as the upper limit stop. This arm extends downardly from the bar 34 alongside the knuckle portion 17 and has its lower end 37 turned inwardly to contact the underside of such knuckle portion in general opposition to the the top adjusting screw 33. The chain 4 connected to the foot treadle 3 is trained over a pulley 38 at the rear of the main arm 10 and connected at its other end to the lower end of the stop arm 36, so that pressing down on the treadle lowers the grinding arm 25 to its operative position, from which it is of course returned by the spring S when the treadle is released.

With regard now to the manner in which a saw chain is held in the grinder, the assembly provided for this purpose comprises the previously mentioned support plate 7 which is held in fixed elevated position above the table and extends similarly as the latter. An angle 39 is disposed transversely on this support plate, projecting to both sides of the same and with its vertical section 40 to the front. The horizontal section is secured to the support plate by two cap screws 41 which can be removed to adjust the angle in and out, and a key 42 carried by the latter slides in a keyway 43 formed in the support plate to guide such movement and maintain the angle in its proper transverse orientation. A bar 44 is fixed to the angle at the front bottom edge of the same, and above this bar an elongated and slotted saw chain guide 45 is secured to the front face of the angle section 40.

Such guide extends horizontally and its upper end corners are rounded as shown most clearly in FIG. 2. The guide is provided with vertical slots 46 to either side of center and thumb screws 47 extend through such slots into the angle section 40, the attachment of the guide thereby being adjustable vertically by means of leveling screws 48 threaded upwardly through the bar 44 into engagement with the bottom edge of the guide.

A box 49 is secured at the rear of the vertical section 40 of the angle 39, and a rear vise member 50 of U-shape is disposed slidably about the top and sides of such box. Such vise member has a plurality of slots 51 extending from the front to the rear in its top and screws 52 are threaded downwardly into the underlying top of the box 49 with their heads respectively in such slots to guide the in and out adjustment of the back vise member. The latter is held in its various selected positions of such adjustment by means of two thumb screws 53 at the sides of the box which pass through slots 54 formed in the front edges of the sides of the vise member.

A solenoid 55 is mounted within the box 49 with its armature horizontal, and a shaft 56 connected to the armature extends axially forward from the same through an opening provided therefor in the angle section 40 and aligned openings in the slotted guide 45. A front vise member 57 in the form of a plate having a rearwardly directed flange or jaw 58 at its upper edge is positioned in front of the guide 45 with its lower edge resting on the support plate 7 and its such top flange opposed to the forward extension or jaw 59 of the rear vise member 50. The armature-connected shaft 56 extends freely through the thus positioned front vise member 57 and has a knob 60 on its outer end, with a spring 61 disposed about the shaft between such knob and the front vise member.

With the bottom portion of the front vise member 57 abutting the bar 44, as shown, the spring 61 tends to hold such member in an opened position, and energization of the solenoid 55 draws the member 57 inwardly to close the jaw 58 against the jaw 59, the latter when adjusted being the stationary jaw of the vise. Such operation is made automatically responsive to lowering of the grinding head by placing in the energization circuit of the solenoid 55 a normally closed micro-switch 62 which is mounted on the top of the grinder arm 25 and securing an actuator 63 to the bracket 18 to engage and depress the plunger of such switch when the grinding arm is in its elevated position. Accordingly, the solenoid is energized to actuate the vise whenever the grinding head is lowered and the vise automatically releases upon the spring return of the head to its rest position.

With particular reference now to FIGS. 6 and 7, a saw chain is actually clamped in the described vise assembly by gripping the flat sides of its links 64, 65 above the rivets 66, with the bottoms of the links supported on the top edges of the guide 45 and the root portions 67 accommodated between the latter. Such clamping by the vise members 58, 59 is superior to the usual method of clamping the chain root portions, since the latter are not integral with the cutter links 64 and the clamping thereby depends on the rivets between the two such elements. Should there be any play in the rivets, which is often the case, the tooth or cutter will vibrate while being ground and this of course leads to inaccuracies which may be on the order of several thousandths of an inch.

The vertical adjustment of the saw guide 45 in my grinder will now be seen to permit the improved type of clamping described with chains of different heights, with the adjustment being made so that the jaws of the vise contact the same just above the rivets. This brings the jaws substantially even with the top edges of the links but well enough below the tooth or cutting edge to preclude interference with the grinding wheel. Such improved clamping can, moreover, be realized with chains of varying thickness in view of the earlier set forth adjustment of the back or stationary jaw of the vise which is provided.

In such adjustment of the stationary jaw 59, it must be determined when the chain is centered and in a true vertical plane and for this purpose the grinder includes means for properly setting up the chain with the jaws open or disengaged and the back jaw loosened for adjustment. Such means comprises a centering screw 68 threadably supported by a post 69 secured to the table 7 and extending horizontally through an opening in the front vise member 57 to engage the saw guide 45. When the screw 68 is tightened it causes the slotted guide to be compressed firmly to grip the root portions of the chain and hold the same in a true vertical position. The back vise member 50 is then moved forwardly against the rear of the chain links and locked at such setting, whereupon the centering screw 68 is loosened sufficiently to permit the chain to slide freely along the guide; as set forth in the above, the guide will have been centered over the main arm pivot in the event that any misalignment has occurred.

The grinder is further provided with indexing means including a pawl 70 carried by an arm 71 which extends through a block 72 pivoted at the right front of the guide 45. Such pawl extends downwardly at an angle, to the right, and serves as a stop against which a cutter element is backed to position the same for grinding, the chain being advanced from left to right along the bar and the arm of course swinging to permit the pawl to ride up over the chain elements as they move in such direction.

The pawl arm 71 is actually a shaft which passes through a sleeve 73 carried by the block 72, with the two axially keyed, and a thumb nut 74 is threaded on the outer end of the shaft. A spring 75 secured at one end to the shaft and abutting the left end of this sleeve biases the two elements apart against the thumb nut, and the latter provides fine adjustment of the extension of the arm 71 and hence the location of the pawl above the vise. Coarse adjustment of the pawl position is provided by permitting the sleeve 73 to be advanced or retracted through the block 72 upon release of a set screw 76 which will hold the sleeve in the particular adjusted position when tightened thereagainst.

In the operation of this grinder, the back vise member 50 will first be loosened and moved to its rearmost position. The saw chain to be ground is then inserted in the guide 45, with the indexing pawl 70 rotated out of the way, and the guide is adjusted vertically so that the vise jaws will engage along the top edges of the chain links as described. In making this adjustment, the vertical adjusting screws 48 should be equally raised or lowered to maintain the guide in level condition, determined by sighting along the bottom of the guide which should be parallel to the bar 44.

With the chain thus set at the proper height to be engaged by the jaws of the vise, the centering screw 68 is actuated to clamp the lower projecting tangs of the chain in the guide, the back vise member 50 is moved forward until the jaw 59 uniformly contacts the chain along its width, and the member 50 is locked in such condition. The center screw is now backed off to permit the operator to slide the chain on the guide.

The operator should now inspect the teeth to be ground to select the shortest tooth and position the chain so that this tooth will be the first to be ground. The grinding wheel 30 is then set to the desired angle by rotative adjustment of the main arm 10 to either the right or left depending on the hand of the selected tooth and the main arm is locked at such setting. This angle will of course depend upon the type of wood which is to be cut by the chain and will usually be on the order of from thirty to forty-five degrees. By means of the handle 22, the grinding arm 25 is now rotated and set at the desired bevel and hook angle, usually from thirty to thirty-five degrees, and the arm is lowered until the grinding wheel is engaged with the selected tooth.

With the wheel thus positioned, the depth control is set by the adjusting screw 33, and the indexing pawl 70 is moved into position behind the tooth element. The grinding wheel is now started by actuating the switch 27, preferably in the direction which will cause the motor to grind away from the cutting edge, thereby to reduce the heat and the amount of wire edge left from the grinding process. The wheel is engaged with the cutter for test grinding and of course the solenoid 55 is automatically energized to clamp the chain in the vise. The amount of the tooth being ground is observed and, if insufficient, the pawl 70 is advanced by manipulating the thumb nut 74 which thereby serves as a feed control nut and the depth and finish are of course also checked until satisfactory results are obtained with the initial tooth.

Thereafter the operator relies on the foot treadle 3, manually advancing the chain to the next tooth of the same hand, backing it against the indexing pawl 70, and pressing down on the treadle until the tooth is ground to the adjusted depth limit; the head is lifted automatically and the vise closed and released automatically, so that the operator simply continues to advance and index the teeth in the same manner until all the teeth of like hand have been ground. After the teeth of this set are sharpened, the main arm 10 is adjusted to the identical angle at the other side of the zero setting and the chain is ratcheted to one of the teeth of the opposite hand. The grinding wheel is again lowered into this tooth and the results checked, some slight adjustment of the feed possibly being needed upon comparison with the teeth already finished with respect to over-all length and uniformity. The operation is then repeated for all teeth of the opposte hand.

The chain should next be checked for the setting of the rakers or depth guides, and if it is determined that the same should be lowered to provide uniform biting of the cutters, a grinding wheel with a concave periphery is substituted in the grinder. The working radius of such wheel will naturally be selected to restore the radius of the depth guide or raker at the lowered height of the same to maintain the desired runner action of the rounded front edge as the cutter moves through the wood. The main arm 10 is set at zero and the grinding head rotated about its perpendicular axis until the area of the grinding wheel making contact with the depth guide produces such desired result.

The chain is now positioned so that the grinding wheel rests on the top edge of a cutting element, and while in this condition, a feeler gauge is inserted under the depth control screw 23 of the grinder and such screw advanced thereagainst. For example, if a bite of thirty-thousandths of an inch is desired for the cutting element, a feeler gauge will be used such that when the cutting element is removed from under the wheel and the feeler gauge withdrawn, the head can move downwardly an additional thirty-thousandths of an inch. The indexing pawl 70 is extensibly adjusted to position each tooth so that the depth guide therefor is placed in the grinding position, and the chain is rapidly ratcheted from one tooth to the next and the wheel lowered on each to grind the desired amount off the top edge of the depth guide or raker.

It is particularly significant in this operation of "joining" the rakers of the chain that the treadle 3 acts through the stop means 36 to lower the grinding head. It will be appreciated that the moment arm of this stop about the pivot 24 of the grinding arm is much less with this arrangement than if the head is lowered by depressing the handle 32 at the front of the grinding arm. The moment arm in the latter case is large enough that there may actually be some play, whereby an operator might inadvertently exceed the pre-set depth by pulling down too hard. In the preferred operation described, any possible error on such account is avoided.

In further regard to the indexing means provided in this new grinder, it is also significant to note that the pawl 70 is downwardly directed and overbalanced. As a result, there is no tendency for such pawl to lift in the event that the operator pulls the cutter being indexed too forcibly thereagainst, whereas this action could be produced where an upwardly directed stop assembly is employed for the purpose.

In FIG. 8, I have shown graphically another important characteristic of the new grinder which very substantially prolongs the useful life of the grinding wheel and thus enhances the economy of operation of the machine. This figure shows a fragmented saw chain tooth clamped by the vise members 58, 59 in position for grinding, with the vertical line 77 being both the centerline of the chain guide 45 (the vise jaws) and the axis about which the main arm 10 carrying the grinding head pivots in its horizontal plane. The horizontal line 78 represents the axis of the knuckle 16 about which the grinding arm 25 is perpendicularly rotatively adjusted, while the point 79 indicates the center of the shaft 24 about which the arm pivots in its up and down swinging movement. The distance from such point to the shaft of the motor or, in other words, to the center of the grinding wheel is fixed and is the radius of the arc 80 along which the wheel center moves. This radius and the spacing of the pivot point 79 above the knuckle axis 78 are related so that the center arc 80 intersects the centerline 77 at two points 81 and 82, which will of course be spaced equally above and below the intersection 83 of the centerline and a horizontal line 84 projected from the pivot point.

The spatial arrangement is such, however, that the maximum spacing of the arc 80 from the centerline 77 is quite small. This last deviation has been exaggerated so that it will clearly appear for understanding, and even with such exaggeration, it will be evident that the arc 80 is substantially coincident with the centerline 77 over the appreciable distance from the point 85 to the point 86 located at equal distances respectively above and below the intersection 83. In this arrangement, the variation over the entire distance between these points 85, 86 is so small that the wheel diameter can be such that its center occurs at any place therealong when its periphery is in grinding engagement with the tooth. The practical effect of this is that a wheel can be used having an initial diameter placing the wheel center in the grinding position at the upper point 85 and such wheel can be worn down to a diameter which locates its wheel center at the lower point 86.

The grinding point is indicated at 87, and to give a specific illustration of the feature just discussed, the three arcs 88, 89 and 90 indicate respectively the peripheries of grinding wheels of four, five and six inch diameters. Grinders made in accordance with the invention are now designed to use six inch wheels, with the vertical distance between the knuckle axis 78 and the new pivot point 79 being two and one-half inches and the radius of the wheel center from such pivot point being just under eight inches. When the six inch wheel is first used, the center of the same in the grinding position, with its periphery along the arc 90, occurs at the point 85; when the wheel wears down to a five inch diameter (arc 89), the wheel center is lowered to the mid-point 83, and further reduction of the diameter to four inches (arc 88) depresses the wheel center in the grinding position to the lowermost point 86. The deviation of the wheel center from the centerline 77 over this entire distance, representing a permissible wear of two inches of the wheel, does not exceed $\frac{1}{64}$ of an inch, and this variation has negligible effect on the shifting of the grinding head from one side to the other, so that both the right and left hand cutters of the chain are ground to the same length without having to alter or readjust the other settings.

In FIG. 8, as described above, the wheel is taken to be in its vertical condition, in which the characteristics discussed are most readily illustrated and understood, and accordingly the centerline of the guide is vertical and the indicated arc of the wheel center movement in a vertical plane. The same relationship occurs of course with the wheel in an angular position of adjustment, the wheel center arc similarly intersecting a line drawn from the center of the guide, through the grinding point, and in the plane of the wheel center. Adjustment of the head supporting bracket 18 back and forth on the knuckle portion 17, or radially with respect to the main arm pivot axis, is provided to make sure that the movement of the center of the grinding wheel satisfies the noted relationship.

It will according be seen that the new grinder is compact, extremely easy to operate, and capable of accurately re-machining a saw chain, both to uniformly sharpen the teeth and to provide uniform control of the depth or bite of the same. The several features of the construction which bear particularly on the precision of the grinding are so established as to eliminate the possibility of error, with the novel chain vise being especially significant in this regard. The semi-automatic operations not only greatly expedite the operation but are provided in such a manner as to ensure against non-uniformity as a result of operator judgment.

The grinder described can also be provided with an extension bar, not shown, adapted to be attached at an end of the illustrated guide for extra support of a very long chain. As pointed out earlier, and as will now be apparent, the working assembly of the grinder can be mounted on a bench if desired and in such an arrangement, it would be preferred to retain the disclosed foot control of the grinding head. Workers in the art will further appreciate that the grinding assembly can readily be adapted for the sharpening of circular saws by substitution of a saw support appropriate for the same.

It is also significant that the depth control screw 33 acts against the knuckle portion 17 of circular cross-section, since this means that the bevel angle can be varied without altering the depth setting. That is, the screw 33 can be rotated about such knuckle portion to any such adjusted position and the spacing of its end from the knuckle portion will remain the same.

Other modes of applying the principle of the invention may be employed, change being made as regards the details described, provided the features stated in any of the following claims or the equivalent of such be employed.

I, therefore, particularly point out and distinctly claim as my invention:

1. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, attaching means for securing said guide means to the platform and being adjustable for bodily shifting the guide means to locate the center thereof on the vertical axis of the main arm, a support carried by the main arm assembly and attached to the latter for rotative adjustment about a horizontal axis which intersects said vertical axis at a point slightly above the guide means, said support also being adjustable along such horizontal axis, a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position, spring means for holding the grinding arm normally in such elevated condition, and foot-operated means for depressing the grinding arm to its such operative position.

2. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, attaching means for securing said guide means to the platform and being adjustable for bodily shifting the guide means to locate the center thereof on the vertical axis of the main arm, a support carried by the main arm assembly and attached to the latter for rotative adjustment about a horizontal axis which intersects said vertical axis at a point slightly above the guide means, a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position, spring means for holding the grinding arm normally in such elevated condition, and foot-operated means for depressing the grinding arm to its such operative position.

3. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, attaching means for securing said guide means to the platform and being adjustable for bodily shifting the guide means to locate the center thereof on the vertical axis of the main arm, a support carried by the main arm assembly and attached to the latter for rotative adjustment about a horizontal axis which intersects said vertical axis at a point slightly above the guide means, a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position, and spring means for holding the grinding arm normally in such elevated condition.

4. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, attaching means for securing said guide means to a platform and being adjustable for bodily shifting the guide means to locate the center thereof on the vertical axis of the main arm, a support carried by the main arm assembly and attached to the latter for rotative adjustment about a horizontal axis which intersects said vertical axis at a point slightly above the guide means, and a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position.

5. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, attaching means for securing said guide means to the platform and being adjustable for bodily shifting the guide means to locate the center thereof on the vertical axis of the main arm, a support carried by the main arm assembly and attached to the latter for rotative adjustment about a horizontal axis which intersects said vertical axis at a point slightly above the guide means, a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position, solenoid-actuated means for clamping a saw chain positioned by the guide means, and control means for operating said solenoid-actuated means in response to movement of the grinding arm to its such operative position.

6. A saw chain grinder comprising a horizontal table, a main arm assembly mounted adjacent one end on said table for swinging movement about a vertical axis, an upper platform fixed horizontally above the table and the mounting of the main arm assembly thereon, saw chain guide means disposed vertically on said upper platform, solenoid-actuated means for clamping a saw chain positioned by the guide means, a support carried by the main arm assembly and attached to the latter for rotative adjustment about a horizontal axis which intersects said vertical axis at a point slightly above the guide means, a grinding arm pivotally connected to said support at a predetermined radial spacing from such horizontal axis, said grinding arm carrying a grinding wheel and being movable on its pivotal connection between an operative position in which the wheel is disposed to engage a saw chain in the guide means and a rest position in which the wheel is withdrawn from adjacent the guide means to a relatively elevated position, spring means for holding the grinding arm normally in such elevated condition, foot-operated means for depressing the grinding arm to its such operative position, and control means for operating such solenoid-actuating clamping means in response to movement of the grinding arm to its operative position.

7. In a saw chain grinder including a horizontal table and a support arm assembly mounted on said table for swinging movement about a vertical axis, said support assembly carrying a grinding head, an upper horizontal platform above the table and the mounting of the support arm assembly thereon, said platform being held in fixed relation to the table, vertically disposed saw chain guide means disposed transversely on said platform, and means for adjustably securing said guide means to the platform, the guide means being bodily adjustably positioned so that it is centered on the vertical axis of the support arm assembly.

8. In a grinder for saws and the like, guide means for positioning a saw to be ground, a grinding arm, means pivotally mounting said arm for swinging movement toward and away from said guide means, means for rotatively adjusting the pivot of said arm, an adjustable stop movable with the arm, a cooperable stationary stop surface in the path of movement of said adjustable stop member to be engaged thereby to limit the approach of the arm to the guide means, said stationary stop surface being cylindrical relative to the axis about which the pivot of the arm is rotatively adjustable, whereby the such last adjustment of the arm does not alter the setting of the adjustable stop member, spring means for holding said arm normally in an elevated position withdrawn from the guide means, a foot treadle, and means connected between said hot treadle and the arm at a region of the later spaced a relatively short distance forward of the pivot thereof, actuation of the foot treadle swinging the arm downwardly to a working position adjacent the guide means.

9. In a machine of the character described, vise means for clamping an article on which work is to be performed, a tool-carrying means mounted for movement with respect to said vise means between a rest position removed from the latter and a working position adjacent the same, solenoid means for actuating the vise means to closed condition, and control means for energizing said solenoid means thus to actuate said vise means in response to movement of the tool-carrying means from its rest position to its working position, the solenoid means being de-energized by said control means upon return movement of the tool-carrying means.

10. In a grinder for saws and the like including support means for the saw and a grinding head mounted for swinging movement toward and away from such support means, foot-actuated means for thus moving the grinding head, solenoid-operated means for clamping a saw positioned on such support means, and electrical circuit means for controlling actuation of such solenoid-operated clamping means in response to movement of the grinding head.

11. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, the opposed jaws of such vise members being located to engage, at opposite sides, the side links of a chain supported by said guide means, and means for relatively actuating the vise members to bring the jaws thereof together against a thus positioned chain, thereby to clamp the chain at the side links thereof.

12. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, the opposed jaws of such vise members being disposed to engage a chain supported by the guide means at the side links thereof above the pivotal connections of the same, and means for relatively actuating the vise members to bring the jaws together to clamp the chain at such side link portions thereof.

13. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, means for adjusting such spacing of the jaws and the guide surfaces to locate the former to engage the side links of a chain supported by the guide means, and means for relatively actuating the vise members to bring the jaws thereof together against a thus positioned chain, thereby to clamp the chain at the side links thereof.

14. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, means for adjusting such spacing of the jaws and the guide surfaces to locate the former to engage the side links of a chain supported by the guide means at portions of these links above the pivotal connections of the same, and means for relatively actuating the vise members to bring the jaws together to clamp the chain at such side link portions thereof.

15. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, the opposed jaws of such vise members being located to engage, at opposite sides, the side links of a chain supported by said guide means, and solenoid-operated means for relatively actuating the vise members to bring the jaws thereof together against a thus positioned chain, thereby to clamp the latter at the side links thereof.

16. Means for clamping saw chains and the like having side links, at least some of which carry cutting teeth, and pivotally connected inwardly projecting root links; said means comprising guide means having laterally spaced surfaces defining a slot for loosely supporting such a chain, with the side links thereof having their bottom edges on such surfaces and the inner projections of the root links in the space therebetween, first and second vise members having opposed jaws spaced above such surfaces of the guide means, means for adjusting such spacing of the jaws and the guide surfaces to locate the former to engage the side links of a chain supported by the guide means, and solenoid-operated means for relatively actuating the vise members to bring the jaws thereof together against a thus positioned chain, thereby to clamp the latter at the side links thereof.

17. Clamping means comprising a guide having laterally spaced sections defining a slot to receive a portion of work to be clamped, the separation of such sections normally being greater than thickness of such work portion so that the latter can move in the slot, means for releasably forcing the guide sections together temporarily to clamp such a work portion therebetween, a first vise member mounted adjacent one side of the guide to engage another portion of the work projecting from the guide, means for adjustably positioning said first vise member uniformly to engage the work as thus clamped, the guide sections thereafter being released to free the work, a second vise member opposed to said first member at the other side of the guide, and means for actuating said second vise member cooperably to clamp the work with the pre-positioned first vise member.

18. Clamping means as set forth in claim 17 wherein the second vise member is actuated by solenoid means.

19. In a grinder for saw chains and the like, vertically disposed guide means for positioning a saw section to be ground, a main arm assembly including a horizontal pivot the axis of which is elevated slightly above the top of the guide means, said main arm assembly being movably mounted for planar adjustment of said horizontal pivot rotatively about the vertical centerline of the guide means, with the axis of the pivot intersecting such centerline at the desired point of grinding, bracket means connected to said horizontal pivot extending perpendicularly therefrom and being angularly adjustable about the pivot, a grinding arm attached to said bracket means for swinging movement about an axis transverse of and at a predetermined spacing from the horizontal pivot, said grinding arm extending from such attachment thereof in the direction of the guide means, and a motor-driven grinding wheel carried by the grinding arm and brought adjacent to the top of the guide means and removed from such adjacency by the swinging movement of the grinding arm, the distances between the center of such wheel and the attachment of the grinding arm to the bracket means and between such attachment and the horizontal pivot being such that the center of the wheel, when the latter is initially brought to the grinding position, is spaced slightly from a line drawn through the grinding point commonly in the vertical plane of the guide means and the plane of the wheel, with the wheel center moving, upon decrease of the wheel diameter through permissible wear, along an arc which intersects such line at two spaced points above the grinding point until the wheel center is again approximately at the initial spacing from such line.

References Cited in the file of this patent

UNITED STATES PATENTS

| | | |
|---|---|---|
| 363,730 | Crossman | May 24, 1887 |
| 437,628 | Smith | Sept. 30, 1890 |
| 2,110,396 | Hamilton | Mar. 8, 1938 |
| 2,514,567 | Daggett | July 11, 1950 |
| 2,716,402 | Harrison | Aug. 30, 1955 |
| 2,798,384 | Kester | July 9, 1957 |
| 2,811,873 | Nielsen | Nov. 5, 1957 |
| 2,811,874 | Rethoret | Nov. 5, 1957 |
| 2,824,468 | Nielsen | Feb. 25, 1958 |